(12) United States Patent
Berger et al.

(10) Patent No.: US 9,678,808 B2
(45) Date of Patent: Jun. 13, 2017

(54) METHOD AND APPARATUS FOR WRITE-ONLY INTER-PROCESSOR RESET SYNCHRONIZATION

(71) Applicant: Intel Corporation, Santa Clara, CA (US)

(72) Inventors: Michael Berger, Jerusalem (IL); Khee Wooi Lee, Bayan Lepas (MY); Mukesh Kataria, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 14/576,019

(22) Filed: Dec. 18, 2014

(65) Prior Publication Data

US 2016/0179585 A1    Jun. 23, 2016

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/52* | (2006.01) |
| *G06F 15/17* | (2006.01) |
| *G06F 15/173* | (2006.01) |
| *G06F 11/00* | (2006.01) |

(52) U.S. Cl.
CPC .............. *G06F 9/52* (2013.01); *G06F 11/00* (2013.01); *G06F 15/17* (2013.01); *G06F 15/17325* (2013.01); *G06F 15/17337* (2013.01); *G06F 9/4403* (2013.01)

(58) Field of Classification Search
CPC .................................................. G06F 9/44589
USPC ......................................................... 719/320
See application file for complete search history.

(56) References Cited

U.S. PATENT DOCUMENTS

| | | | |
|---|---|---|---|
| 6,154,785 A | 11/2000 | Lakhat et al. | |
| 2012/0166763 A1 | 6/2012 | Henry et al. | |
| 2012/0166845 A1* | 6/2012 | Henry ................... | G06F 1/3206 713/323 |

OTHER PUBLICATIONS

European Search Report for corresponding Patent Application No. P227233EP; dated May 2, 2016; 8 pages.
The Office Action for counterpart Taiwan Application No. 104136856, 7 pages, mailed Oct. 17, 2016 including translation.

\* cited by examiner

*Primary Examiner* — Timothy A Mudrick
(74) *Attorney, Agent, or Firm* — Blakely, Sokoloff, Taylor & Zafman LLP

(57) ABSTRACT

A method and apparatus is disclosed herein for performing write-only inter processor reset synchronization. In one embodiment, the processing unit comprises: a communication unit to transmit information to the second processing unit; memory to store reset synchronization information and message information; and processing logic to perform write-only reset synchronization between itself and the second processing unit based on bit indications set in the memory.

25 Claims, 11 Drawing Sheets

METHOD AND APPARATUS FOR WRITE-ONLY INTER-PROCESSOR RESET SYNCHRONIZATION

FIELD OF THE INVENTION

Embodiments of the present invention relate to the field of communication between heterogeneous processing cores; more particularly, embodiments of the present invention relate to reset synchronization between processing units (e.g., processor cores, Intellectual Property (IP) cores, etc.) that communicate with each other using write-only communication.

BACKGROUND OF THE INVENTION

Inter-processor communication (IPC) is often used to exchange data between processes running in different processor cores (e.g., different heterogeneous processor cores). These processes may result from programs running on a central processing unit (CPU) or system-on-a-chip (SOC) using different processing cores or threads. Even though the processes may be running separately, they may need to communicate information between each other.

The IPC communication is performed using interfaces of the processing cores or units upon which the processes are running according to communication protocols. At times, the communication protocols are such that the processing cores or unit communicate using peer-to-peer communication. The communication protocols used for IPC communication often include read and write operations to facilitate the exchange of information.

An issue arises when one of the peers in IPC communication with another peer is going to be reset or disabled. A peer may be disabled, for example, when it is being powered down. When this occurs, it is difficult for one peer to know that the other peer is being reset or is disabled. In such a case, the first peer may be waiting on information from the second peer, which could cause the first peer to get into a state in which it is endlessly waiting for a response from the second peer, thereby leading to a hang of the first peer or a heuristic timeout by the first peer (which in some cases may be wrong). In addition, this may lead to a situation where the second peer gets re-initialized but having lost its context, and the first peer keeps sending messages under a false assumption that the second peer is in a different state (e.g., the first peer believes that a session is in progress whereas the second peer lost any notion of that). The same mismatch in state may happen in the other direction as well. Finally, as messages in many cases are not atomic (e.g., made up of a series of register writes), if the first peer sends a non-atomic message and the second peer goes through reset in the middle, it is possible that the reset itself will include a reset in the second peer's message registers, while the first peer is continuing to populate them, leading to the second peer receiving a corrupted message. This may be avoided where the first peer is able to use read operations to read information from the second peer about its state and can determine based on the response to the read operations whether the second peer is unavailable or has gone through reset, particularly in the cases where a timeout or retries would cause the first peer to conclude that the other peer is not available.

While communication reset information between peers is easier to handle when read operations are allowed, read operations present other issues that are undesirable. For example, when a core of a peer is reset or becoming disabled (e.g., disabled due to entering a low power state), these actions can cause the read to fail due to, for instance, the isolation of the core. Also, a communication protocol containing reads may be more difficult to migrate across different underlying buses and/or fabrics.

Thus, it may be desirable to use a communication protocol between peers that doesn't include read operations. However, in situations in which peers only communicate through write operations, the problem of not knowing that the other peer has gone into reset or has otherwise become unavailable remains.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for synchronizing reset operations between a pair of processing elements (e.g., intellectual property (IP) cores, processor cores, processors, system-on-a-chip processing cores, integrated circuits or devices on the same board (that have a reliable underlying communication bus) etc.) that only communicate as peers using a write-only method are described. The techniques described herein enable each processing element to detect that its peer enters a state that it is entering reset, exiting reset, becoming disabled or otherwise unavailable (either permanently or because system is entering a lower power state in which the processing element is not functional), or is resetting communication only. Because the peers communicate with each other using only write operations, each processing element is not able to know whether its peer received the last transaction from the processing element, yet the processing elements are still able to synchronize the resetting of the communication channel between them.

Figure 1:
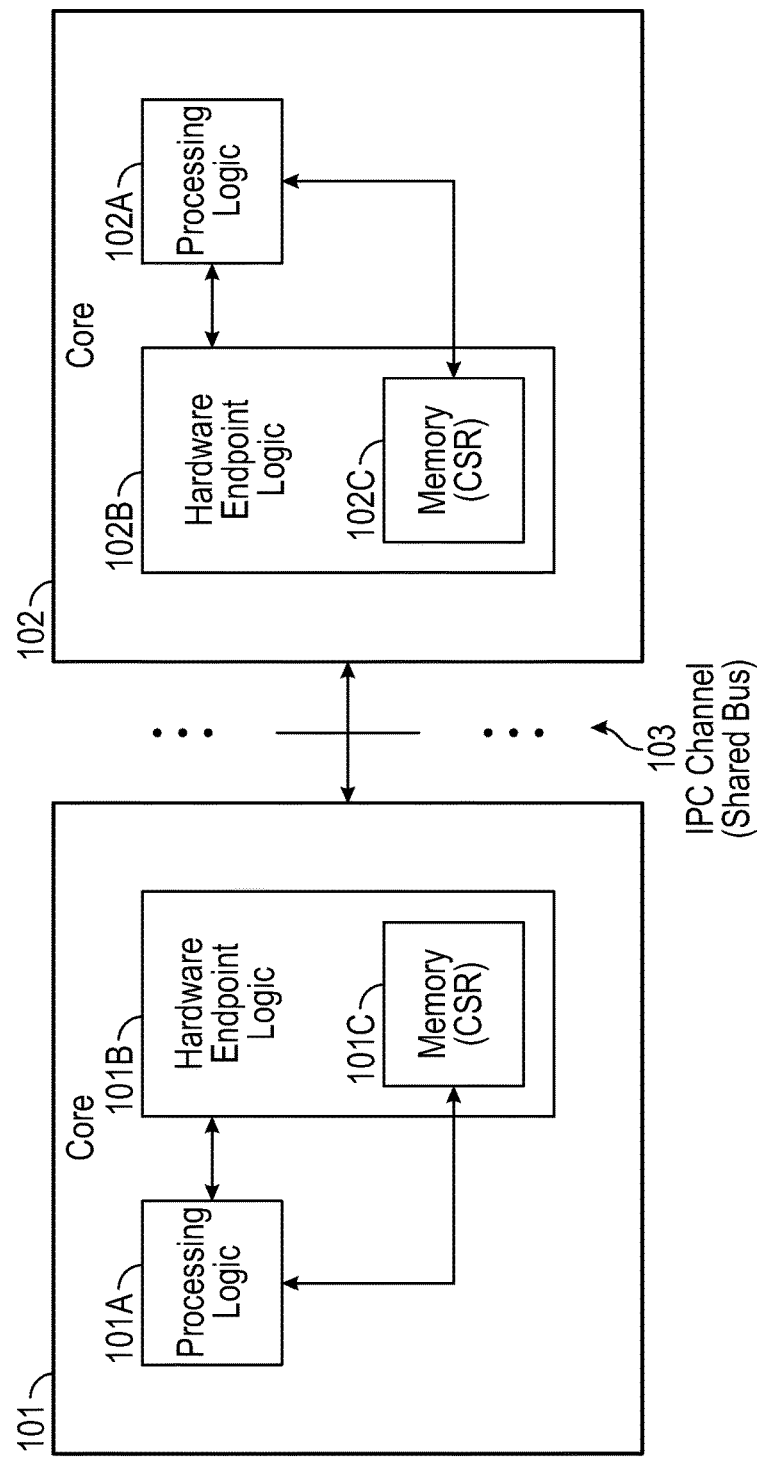
FIG. 1 illustrates two processing elements that are able to communicate with each other using a write-only communication protocol.

FIG. 1 illustrates two processing elements that are able to communicate with each other as peers using a write-only communication protocol (in which communication between the two processing elements only occurs through the use of write operations).

Referring to FIG. 1, processing units 101 and 102 (e.g., processor cores, Intellectual Property (IP) cores, dedicated processing units, etc.) are peers in communication with each other. Each of processing units 101 and 102 may be in the same integrated circuit (IC) or different ICs. Each of processing units 101 and 102 can asynchronously enter reset or exit reset, get disabled, become unavailable, or reset the communication channel, communication channel 103, between them.

In one embodiment, communication channel 103 is an inter-processor communication channel. Communication channel 103 is for exchanging information (e.g., requests, status, etc.) and other messages between processing units 101 and 102.

Processing unit 101 includes processing logic 101A to perform operations associated with their designated function in a system, including the reset synchronization operations described herein, and hardware endpoint logic 101B to communicate (e.g., transmit) with one or more other processing units, such as processing unit 102, using communications channel 103. Similarly, processing unit 102 includes processing logic 102A to perform operations associated with their designated function in a system, including the reset synchronization operations described herein, and hardware endpoint logic 102B to communicate (e.g., transmit) with one or more other processing units, such as processing unit 101, using communications channel 103. More specifically, processing logic 101A and processing logic 101B perform operations with respect to write-only reset synchronization between itself and the second processing unit based on bit indications set in memory 101C. Note that in an alternative embodiment, processing unit 101 and 102 do not have a hardware endpoint unit and instead all of the hardware actions (e.g., writes to other peers etc.) are emulated by software or firmware.

Each of processing units 101 and 102 includes memory to store a set of indications (e.g., bits) from its peer. In other words, processing unit 101 includes a memory, such as memory 101C (e.g., a control status register (CSR)), that stores bits (bit indications) that are from processing unit 102. Likewise, processing unit 102 includes a memory, such as memory 102C (e.g., a CSR), that stores bits that are from processing unit 101. In one embodiment, the processing unit can set-by-one to bits in the memory (e.g., CSR) of its peer or clear-by-one to bits stored in its own memory (e.g., CSR). That is, processing unit 101 can set each of these bits in memory 102C of processing unit 102, and vice versa. By being set-by-one (or clear-by-one), even if the peer sends the same indication (bit indication) multiple times, the processing unit will only perceive this as a single indication. Having one peer set bits and one side clear bits of the same memory is important in order to prevent either side overwriting updates from the other side when updating a given memory (CSR).

Note that in alternative embodiments, the bit indications could be set-by-one and clear-by-zero, or set-by-zero and clear-by-one, or set-by-zero and clear-by-zero.

In one embodiment, the set of indications includes an indication that the processing unit will not transmit any more transactions on communication channel 103 unrelated to reset synchronization protocol and has reset its communication state. This includes the cases where processing unit itself has gone through reset or has exited reset but will go through reset. In one embodiment, this indication is mandatory and must be supported by one or both processing units.

In one embodiment, the set of indications includes an indication that the processing unit has discarded, or dropped, any unprocessed incoming messages unrelated to reset synchronization protocol. In one embodiment, this indication is mandatory and must be supported by one or both processing units.

In one embodiment, the set of indications includes an indication that the processing unit indicates to the peer that both two indications discussed above have been set, and requests the peer to disambiguate by setting again only one of the indications set above. In such a case, the processing unit clears the two indications so that the processing unit can determine which is set again by the peer.

As part of the reset synchronization protocol, processing units 101 and 102 use the indications to send notifications to each other such as the reset phase state they are in, as well as notify the other processing unit of actions taken with respect to resetting communication channel 103. In one embodiment, a processing unit enters reset or gets disabled without continuing a handshake with a peer processing unit, and only needs to sets a first indication (e.g., bit) and shuts down. No acknowledgement (ACK) or further communication is needed by the processing unit before going into reset or being disabled.

In processing units 101 and 102, hardware endpoint logic 101A and 101B are communication units. In one embodiment, these units handle sending information and messages to other processing units, including the setting of indications (e.g., bit indications) of other processing units. In one embodiment, these units handle doorbells and interrupts, as well as generating interrupts to the processing logic when a reset synchronization indication has been set in its memory so that the processing logic can take actions described herein.

In one embodiment, as part of the reset synchronization protocol, both processing units 101 and 102 temporarily disable their outgoing traffic, both processing units receive an indication from the other processing unit (its peer) that its outgoing traffic is temporarily disabled, each processing unit clears any residual incoming traffic from the other processing unit (such that no new traffic occurs at this point in time in the reset synchronization process), and then resume communication.

In one or more embodiments, the techniques described herein are such that: no use is made of timeouts/retries (which may have false positives/false negatives and lead to complex retry logic); resets within resets of a given processing core, as well interleaved resets between a given processing element and its peer, can be handled without special logic; stale messages are dropped before resuming communication; situations in which a processing element starts communication while its peer accidently drops valid incoming messages are avoided; "deadlocks" (i.e., no processing element reaches a state where it endlessly waits for its peer) are avoided; "livelocks" (i.e., the protocol never reaches a state where endless channel reset "ping-pongs" occur between processing element where such "ping-pongs" can prevent the communication channel from reaching a stable operational state, and as opposed to deadlocks are much harder to detect when formulating a protocol) are avoided; either processing element can asynchronously enter reset without waiting for an acknowledgement (ACK) from its peer (because in many cases processing element reset occurrence means that the processing element is in a bad state or that a watchdog expiration occurred and it's undesirable to delay reset of the processing element due to a dependency on peer which may be busy); there is a simple way for an processing element to indicate to a peer that the processing element got disabled (i.e., no further communication is possible), without involving complex protocol exchange (and without requiring full blown driver), which helps security in case of denial of service (DoS) to an IP—as long as it can easily indicate to its peers that it's disabled without full blown driver, this allows the peers to detect DoS without increasing peer's TCB (e.g., if operation is simple it can easily be done from an IP's ROM); the various cases (entering reset, exiting reset, becoming disabled, resetting only the communication channel) do not require different handshakes (for simplicity); and both processing elements are guaranteed to become operational and end up discovering each other, without forcing any pre-defined constraint for reset exit order.

Embodiments of the protocol are described in more detail below.

Figure 2:
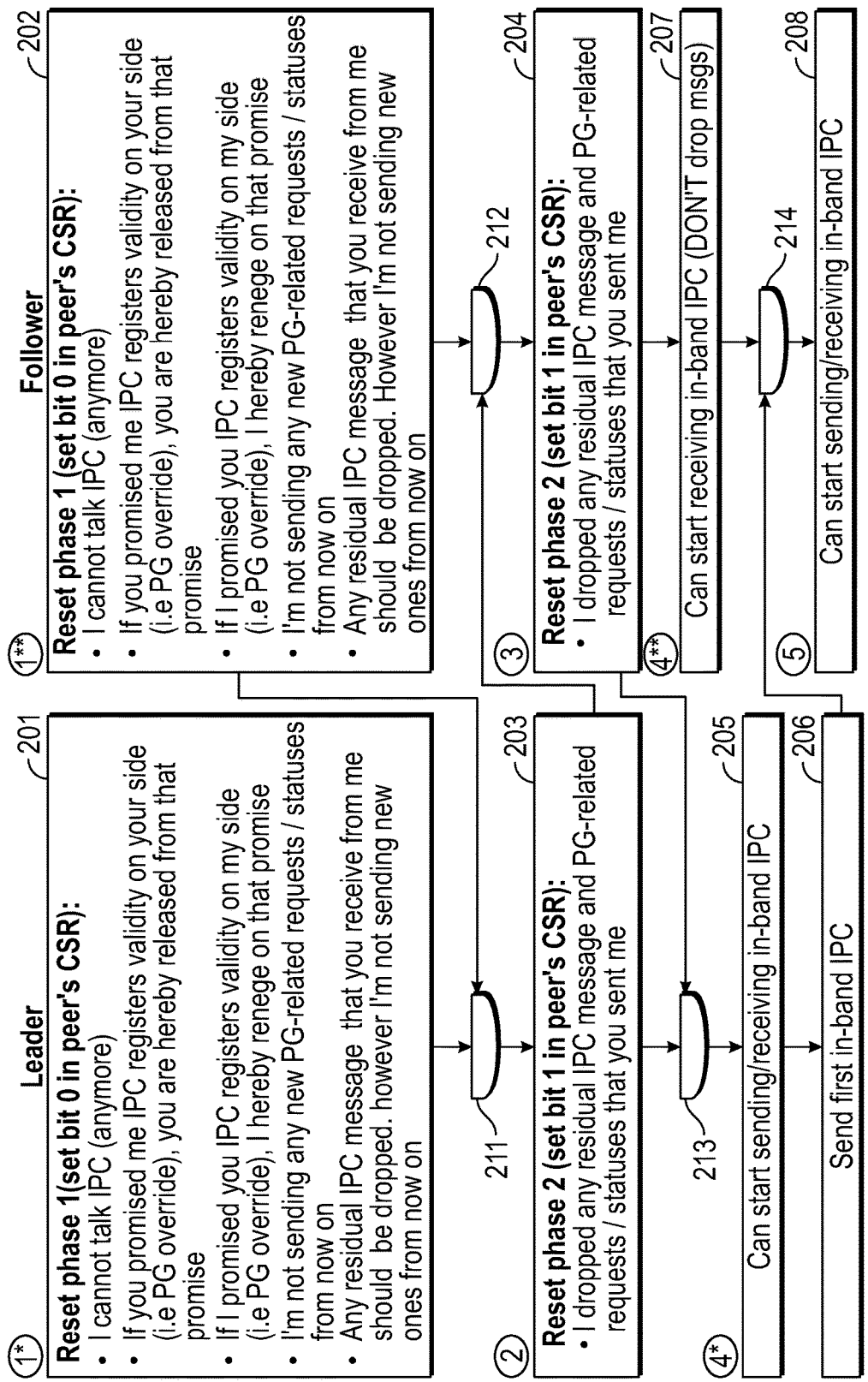
FIG. 2 is a flow diagram of one embodiment of a reset synchronization process.

FIG. 2 is a flow diagram of one embodiment of a reset synchronization process. The process is performed by processing logic that may comprise hardware (circuitry, dedicated logic, etc.), software (such as is run on a general purpose computer system or a dedicated machine), firmware, or a combination of these three. In one embodiment, the process is performed by two peers (processing units), one designated the "leader" and one designated the "follower", which only use write operations to communicate. The use of a leader and a follower breaks the symmetry (in order to avoid endless "ping-pongs" between the peers). In one embodiment, this is a fixed designation per processing unit pair. While each of the processing units can asynchronously start the reset synchronization, once started, the follower ensures not to advance in its stages beyond the leader until the synchronization is completed.

In FIG. 2, the circled numbers indicate restrictions on the ordering of operations in one embodiment. In some cases (e.g., a number which appears with "*" and "**"), there is no restriction on which operations occurs first. Also, gates reflect "AND" conditions that in some cases a processing unit (peer) can only proceed to the next operation if both some internal condition has been fulfilled and the other peer informed the processing unit about a peer's condition being fulfilled.

Referring to FIG. 2, processing logic in the leader (the first peer) enters Reset Phase 1, in which the first phase of the reset process begins, and notifies the follower (the second peer) that it has entered Reset Phase 1 (processing block 201). In one embodiment, the leader notifies the follower that it has entered Reset Phase 1 by setting a bit in the follower's control status register (CSR). In one embodiment, the leader sets bit 0 in the follower's CSR to indicate that the leader has entered Reset Phase 1.

By notifying the follower that the leader has completed Reset Phase 1 actions, the leader indicates that it will not be able to communicate via inter-processor communication (IPC) with the follower until it is no longer in reset. Also the leader has indicated to the follower that if the follower had provided any guarantee regarding the validity of an IPC register value (e.g., through a value of a CSR bit), then the follower is no longer obligated to it. For example, if the follower was to provide power gating override guarantee (i.e., a guarantee to prevent power gating (i.e., turning off power) from occurring), the follower is no longer obligated towards the leader to perform power gating override as the leader has entered reset phase 1. Furthermore, by entering Reset Phase 1, the leader indicated to the follower that if there was any IPC register validity guarantee that the leader had provided to the follower, then the leader is no longer going to provide such guarantee. Moreover, by entering Reset Phase 1, the leader has indicated that it will no longer send any new PG-related requests or status information to the follower from this point forward. Lastly, by entering Reset Phase 1, the leader indicates that any residual IPC message that has been previously sent from the leader to the follower should be discarded, and the leader will not be sending any new IPC messages to the follower from this point forward.

After or before notifying the follower that it has completed Reset Phase 1 actions (e.g., setting bit 0 in the follower's CSR), the follower may notify the leader that the follower has completed Reset Phase 1 actions (processing block 202). In one embodiment, the follower notifies the leader that it has completed Reset Phase 1 actions by setting a bit in the leader's control status register (CSR). In one embodiment, the follower sets bit 0 in the leader's CSR to indicate that the follower has completed Reset Phase 1 actions. As with the leader, by notifying the leader that the follower has completed Reset Phase 1 actions, the follower indicates that it will not be able to communicate via inter-processor communication (IPC) with the leader until it is no longer in reset. Also the follower has indicated to the leader that if the leader has provided any guarantee regarding the validity of an IPC register value (e.g., through a value of a CSR bit), then the leader is no longer obligated to it. For example, if the leader was to provide PG override guarantee, the leader is no longer required to provide such guarantee to the follower as the follower has entered reset phase 1. Furthermore, by entering Reset Phase 1, the follower indicates to the leader that if there was any IPC register validity guarantee that the follower had provided to the leader, then the follower is no longer obligated to it. Moreover, by entering Reset Phase 1, the follower has indicated that it will no longer send any new PG-related requests or status information to the leader from this point forward. Lastly, by entering Reset Phase 1, the follower indicates that any residual IPC message that has been previously sent from the follower to the leader should be discarded, and the follower will not be sending any new IPC messages to the leader from this point forward.

The leader is able to enter Reset Phase 2 after being in Reset Phase 1. A test determines if both the leader and the follower have indicated to each other that they have completed Reset Phase 1 actions (processing block 211). That is, the leader waits for the follower to complete Reset Phase 1 actions prior to leader entering Reset Phase 2. If both the leader and the follower have completed Reset Phase 1 actions, the reset synchronization process transitions to processing block 203 where the leader performs Reset Phase 2 actions and indicates that it has completed Reset Phase 2 actions. In one embodiment, the leader indicates to the follower that it has completed Reset Phase 2 actions by setting a bit in the follower's CSR. In one embodiment, the leader sets bit 1 in the follower's CSR to indicate to the follower that the leader has entered Reset Phase 2. The Reset Phase 2 actions consist of the leader dropping any residual IPC messages and any PG-related request and status information that has been sent to the leader from the follower.

Note that the follower does not enter Reset Phase 2 until after the leader does so.

Processing logic tests whether the follower has completed Reset Phase 1 actions (and has notified the leader that it has done so) and the leader has completed Reset Phase 2 actions (processing block 212). If so, the process transitions to processing block 204 where the follower enters Reset Phase 2. The follower performs Reset Phase 2 actions and notifies the leader that it has completed Reset phase 2 actions by setting a bit in the leader's CSR. In one embodiment, the follower notifies the leader that it has completed reset Phase 2 actions by setting bit 1 in the leader's CSR. The follower notifies the leader that it has completed Reset Phase 2 actions after dropping any residual IPC messages and PG-related request and status information that has been sent to the follower from the leader.

After the follower completes Reset Phase 2 actions, the follower can enter Operational Phase and start receiving in-band IPC messages (processing block 207). This means that the follower will no longer drop any messages.

It should be reiterated that the exchange between the leader and follower regarding entry into Reset Phase 1 and 2 is for resetting the IPC channel and not necessarily for reset the leader and/or the follower in its entirety. That is, while the leader may be undergoing a reset operation, the follower is not required to be reset itself, only the channel between the two is reset. The same is true when the follower is undergoing reset and the leader and follower need only reset the channel between them.

Thereafter, processing logic at the leader tests whether the leader and the follower have both completed reset phase 2 actions (processing block 213). If so, the leader process transitions to processing block 205 where the leader can start sending and receiving in band IPC messages, and IPC communication can occur between the leader and the follower by having the leader send a first in-band IPC message (processing block 206).

Note that these operations of starting to send and receive in band IPC messages and sending the first IPC message can occur prior to the time or after the time that the follower is able to start receiving in band IPC messages in processing block 207. However, the follower cannot send an IPC message after exiting Reset Phase 2 until it has already received the first in-band IPC message from the leader.

Processing logic at the follower tests whether both the first IPC message has been sent from the leader and the follower is able to start receiving in band IPC messages as indicated in processing block 214. If so, the follower can start sending and receiving in-band IPC messages (processing block 208).

Figure 3:
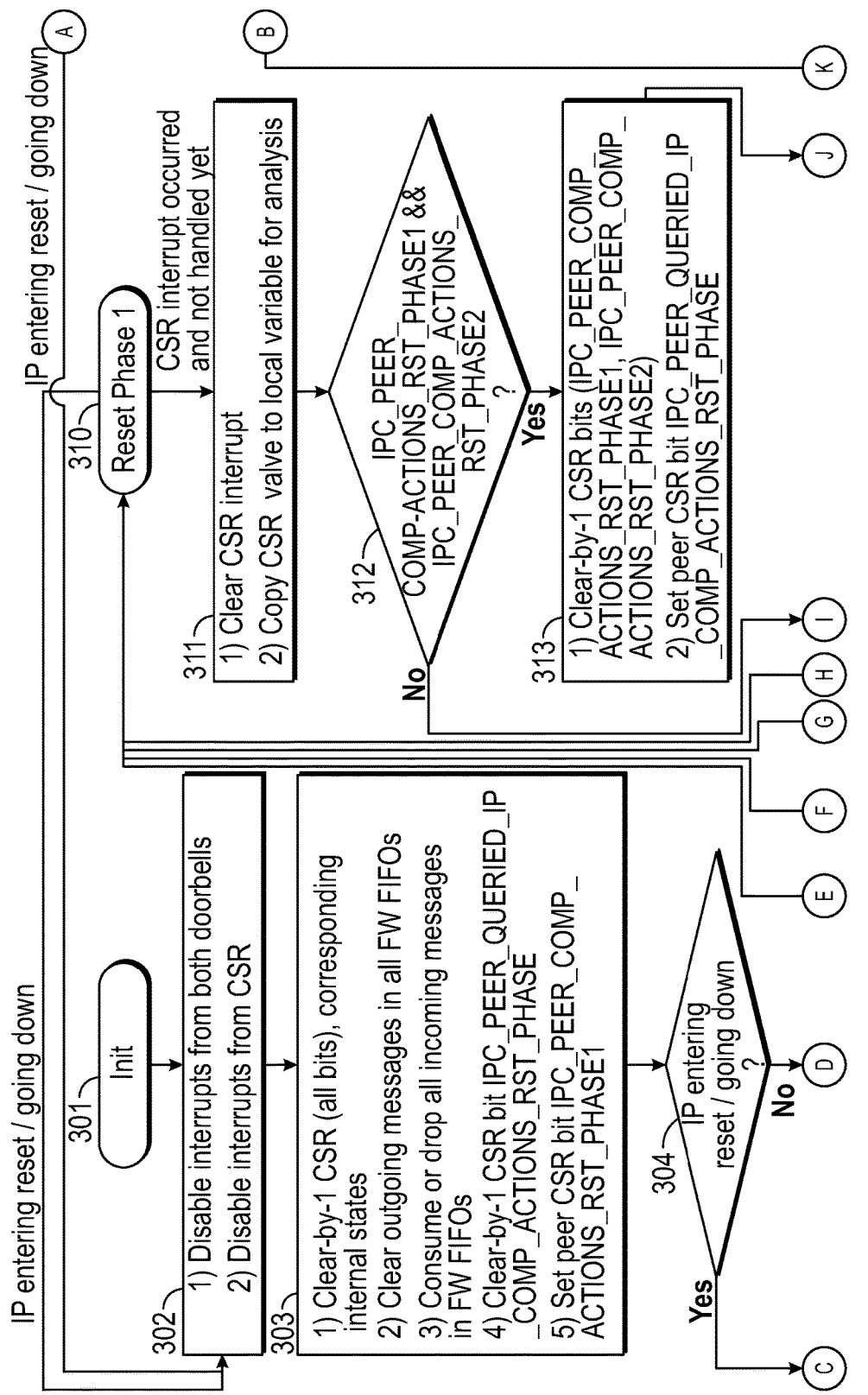
FIGS. 3 and 4 are more detailed flow diagrams of the operations performed by the leader and the follower in reset synchronization, respectively.
Figure 3:
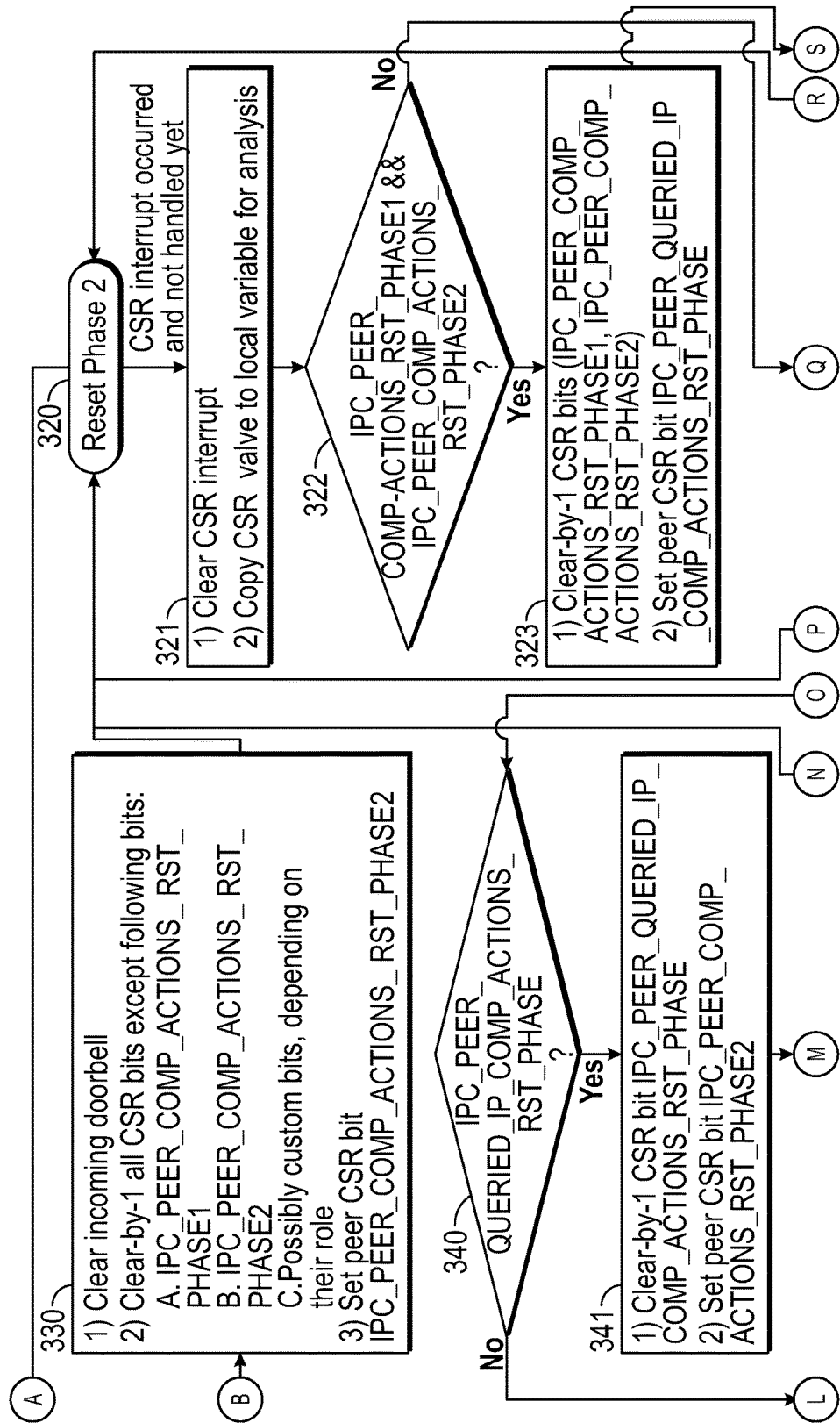
Figure 3:
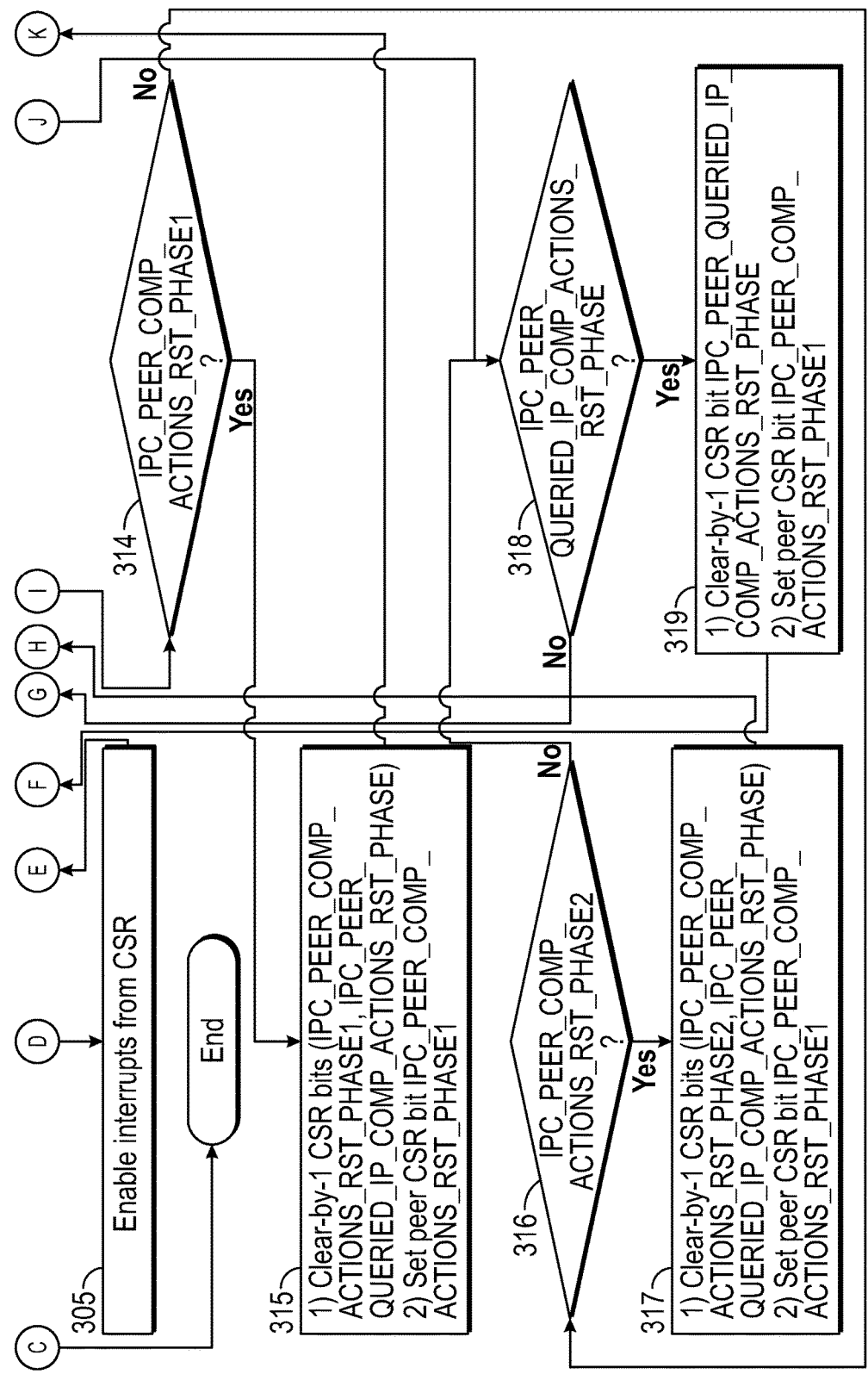
Figure 3:
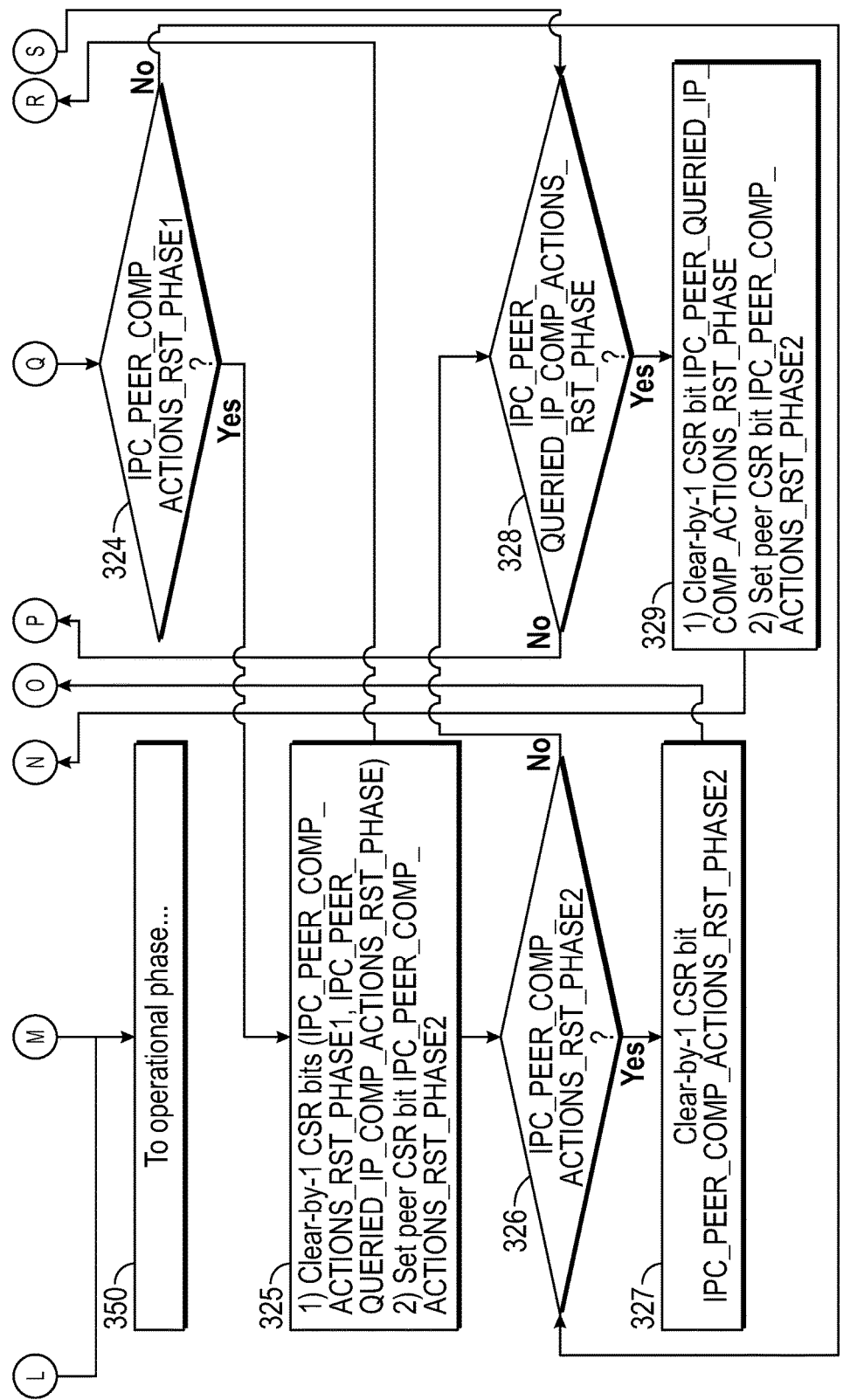
Figure 4:
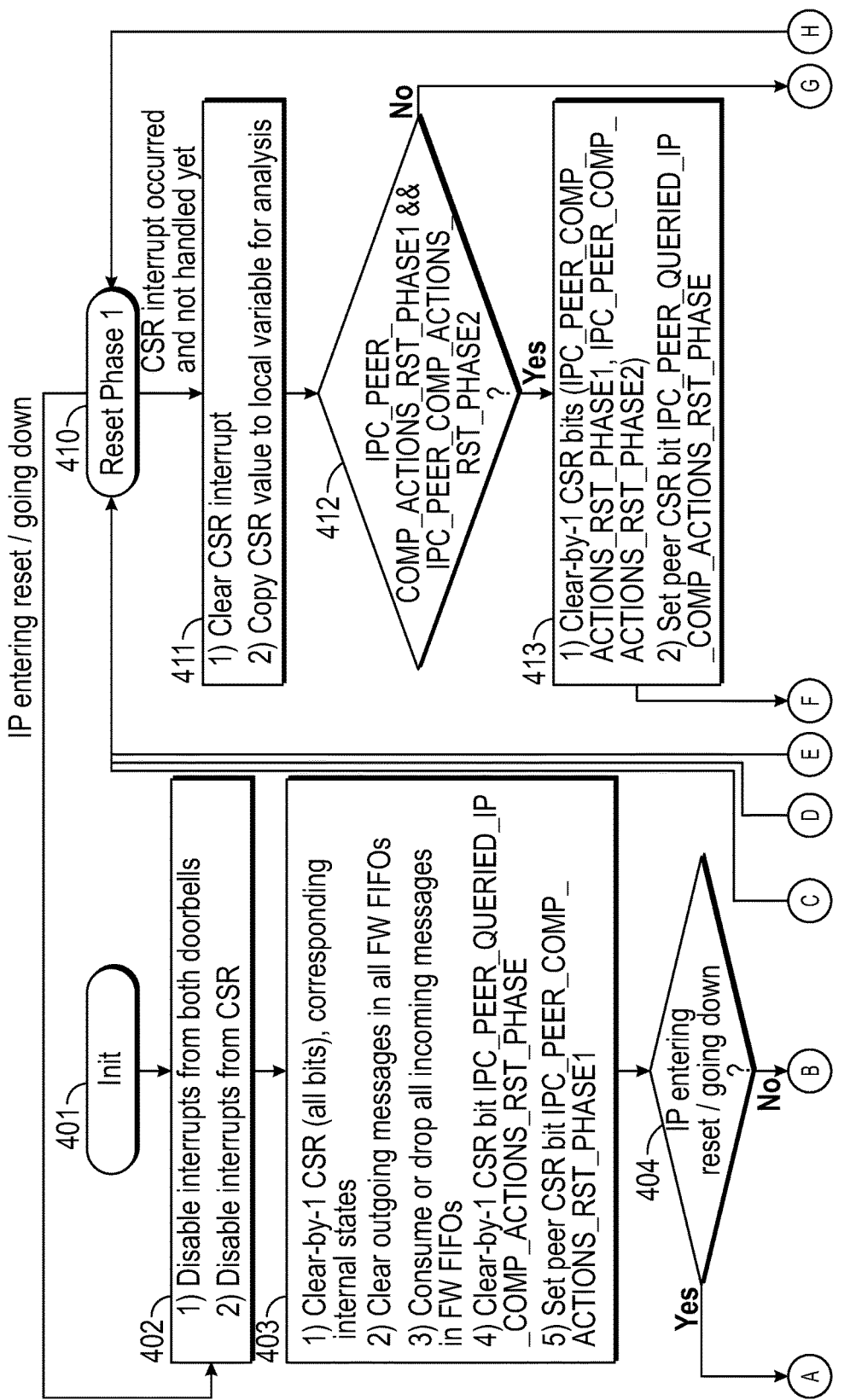
Figure 4:
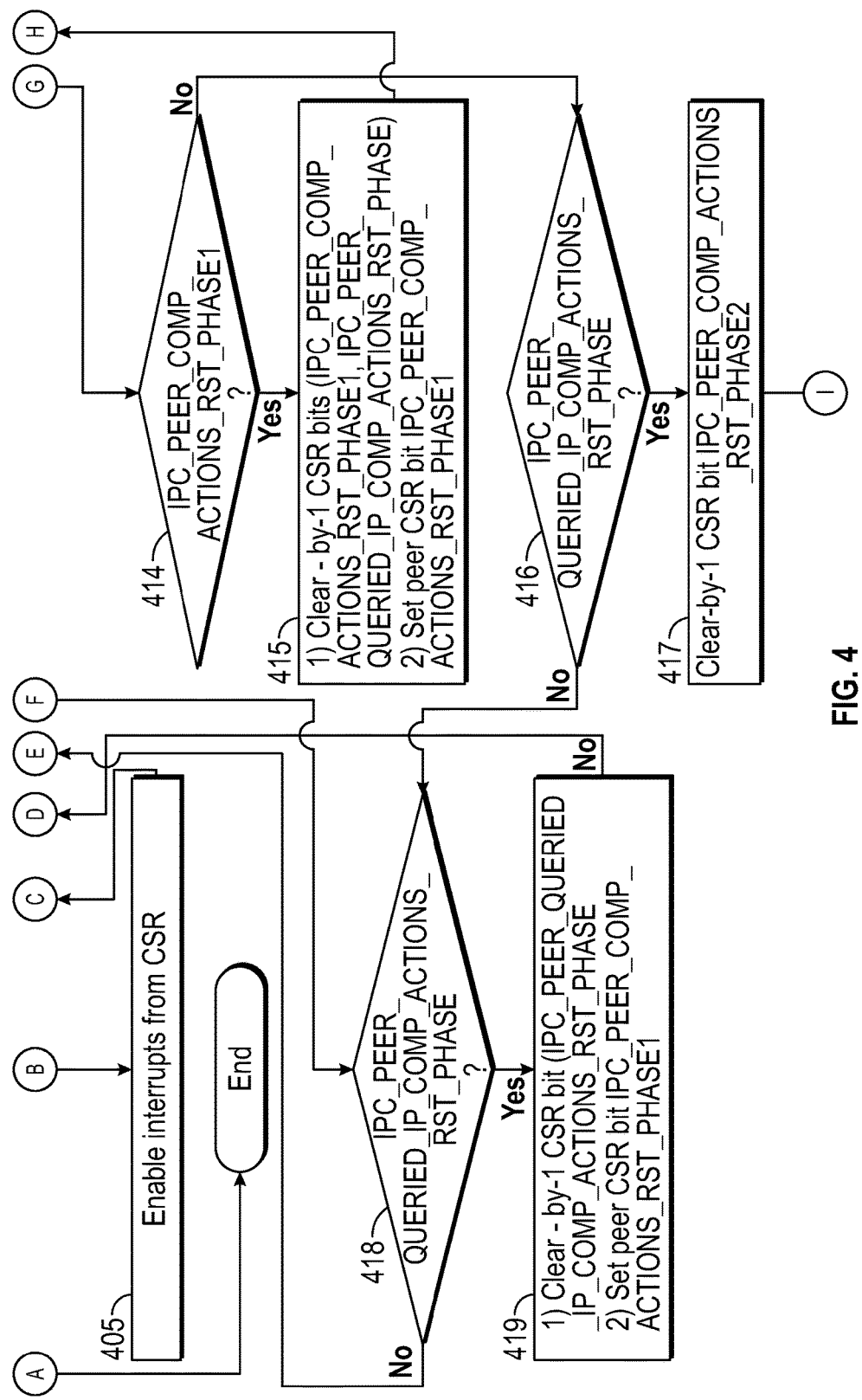
Figure 4:
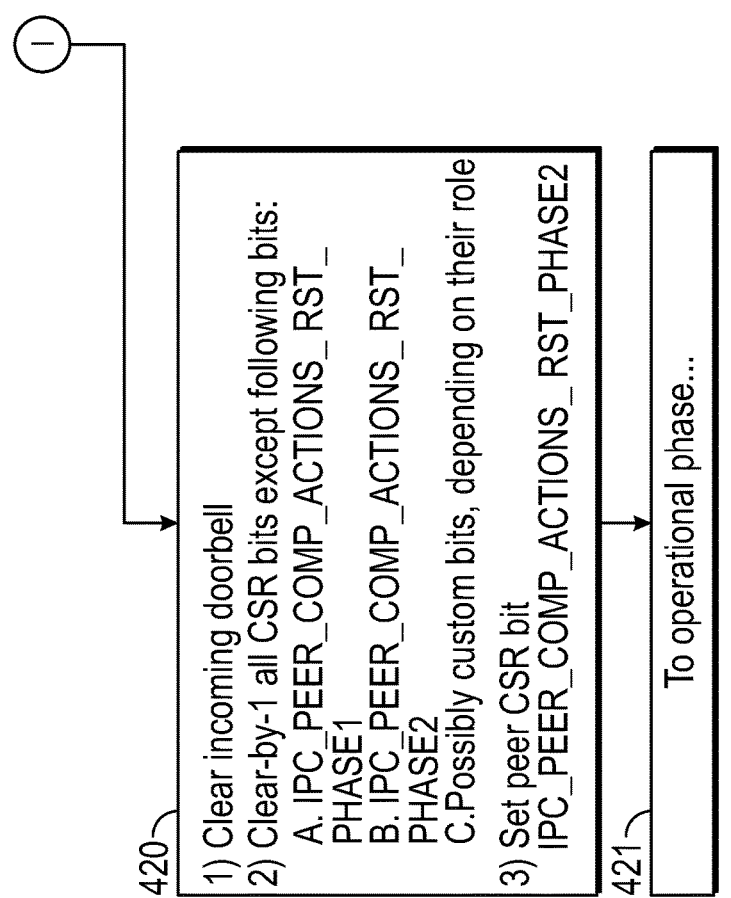

FIGS. 3 and 4 are more detailed flow diagrams of the operations performed by the leader and the follower in reset synchronization, respectively. The process is performed by processing logic that may comprise hardware (circuitry, dedicated logic, etc.), software (such as is run on a general purpose computer system or a dedicated machine), firmware, or a combination of these three.

Referring to FIG. 3, the process performed by the leader starts at initialization (301). During initialization (301), processing logic of the leader disables the interrupts from both doorbells and disables interrupts from the CSR (processing block 302). Note that in one embodiment, an incoming doorbell is a second separate register used to indicate that a message from a peer is ready for consumption in the data registers. When the peer finishes writing the message data, it writes to the doorbell (e.g., setting a bit called "busy" bit), and this causes an interrupt. An outgoing doorbell is a third separate register that reflects the incoming doorbell at the peer. In one embodiment, when the processing logic writes data to the peer and sets its doorbell (e.g., busy bit), the processing unit does this through its own outgoing doorbell register, which causes the busy bit to be set at the peer's incoming doorbell register. When the peer finishes evicting the message from the registers, it clears the busy bit on its incoming doorbell register, and this gets reflected back to the processing unit's outgoing doorbell register and causes an interrupt. This clearing of the busy bit at the outgoing doorbell register is indication to the processing unit that it can now send a new message without fear of overwriting a previous message.

In one embodiment, the interrupts from the CSR are interrupts from the hardware endpoint logic that notifies the processing logic of the core that different bits in the CSR have been set.

Thereafter, processing logic of the leader clears the CSR bits corresponding to the internal states (e.g., an indication of whether the follower has completed Reset Phase 1 actions, an indication of whether the follower has completed Reset Phase 2 actions, and other CSR bits), clears the outgoing messages in all the firmware (FW) first-in first out buffers (FIFOs) in the memory of the leader, consumes or drops all incoming messages in the FIFOs, clears-by-1 the CSR bit indicating that the follower queried the leader to determine in which reset phase state the leader currently resides, and sets an indication in the follower indicating that the leader has completed the actions of reset phase 1 (processing block 303). In one embodiment, this indication is referred to in FIG. 3 as the IPC_PEER_COMP_ACTIONS_RST_PHASE1 bit indication.

Then the process transitions to processing block 304 where processing logic tests whether the leader is entering reset or powering down. If it is, the process ends. If not, the process transitions to processing block 305 where processing logic enables interrupts from the CSR. After enabling the CSR interrupts, the process transitions to Reset Phase 1 wait state (310).

At Reset Phase 1 wait state (310), processing logic waits for a CSR interrupt to occur indicating that some bit in the CSR register has been set and not handled yet. When a CSR interrupt occurs, the process transitions to processing block 311 where processing logic clears the CSR interrupt and copies the CSR values to local variable storage for analysis. Then processing logic in the leader tests whether the follower has indicated that has completed both Reset Phase 1 actions and Phase 2 actions (processing block 312). This is done by checking whether the IPC_PEER_COMP_ACTIONS_RST_PHASE1 and IPC_PEER_COMP_ACTIONS_RST_PHASE2 bit indications are set. If they are both set, the process transitions to processing block 313 where processing logic clears both the IPC_PEER_COMP_ACTIONS_RST_PHASE1 and IPC_PEER_COMP_ACTIONS_RST_PHASE2 bit indications, and queries the follower as to reset phase state in which the follower resides. To query the follower's state, processing logic in the leader sets an indication in the follower. In one embodiment, this is done by setting the IPC_PEER_QUERIED_IP_COMP_ACTIONS_RST_PHASE bit indication in the follower's CSR. After doing so, the process transitions to processing block 318.

At processing block 318, processing logic in the leader determines whether the leader was queried by the follower as to the reset phase in which the follower currently resides. In one embodiment, this is performed by the leader checking its IPC_PEER_QUERIED_IP_COMP_ACTIONS_RST_PHASE bit indication in its CSR copy in memory. If so, processing logic clears its IPC_PEER_QUERIED_IP_COMP_ACTIONS_RST_PHASE bit indication and notifies the peer of its current reset phase, which is phase 1 (processing block 319). In one embodiment, the leader notifies the follower of its reset phase state by setting the CSR bit corresponding to the IPC_PEER_COMP_ACTIONS_RST_PHASE1 bit indication in the follower's CSR. Thereafter, the process transitions to the wait state of Reset Phase 1 (310). Referring back to processing block 318, if the follower did not query as to the current state in which the leader currently resides, processing block transitions to the wait state of Reset Phase 1 (310).

Referring back to processing block 312, if either of IPC_PEER_COMP_ACTIONS_RST_PHASE1 and IPC_PEER_COMP_ACTIONS_RST_PHASE2 bit indications is not set, the process transitions to processing block 314 where processing logic tests whether the follower has completed Reset Phase 1 actions. In one embodiment, this is done by checking the copy of IPC_PEER_COMP_ACTIONS_RST_PHASE1 bit indication that was set by the follower in the leader's CSR indicating that the follower has completed Reset Phase 1 actions. If so, the process transitions to processing block 315 where processing logic in the leader clears the IPC_PEER_COMP_ACTIONS_RST_PHASE1 and IPC_PEER_QUERIED_IP_COMP_ACTIONS_RST_PHASE bit indications in its CSR and indicates to the follower that the leader has completed Reset Phase 1 actions. In one embodiment, the leader indicates to the follower that it has completed Reset Phase 1 actions by setting the IPC_PEER_COMP_ACTIONS_RST_PHASE1 bit indication in the CSR of the follower. Thereafter, the process transitions to the processing block 330.

At processing block 330, processing logic in the leader clears an incoming doorbell and all bit indications in its CSR except the IPC_PEER_COMP_ACTIONS_RST_PHASE1 and IPC_PEER_COMP_ACTIONS_RST_PHASE2 bit indications, and optionally one or more custom bits (depending on their role). In one embodiment, these include bits used for a validity protocol to validate information (bits) in the CSR and used for simple messages which processing unit pairs can pass between them and which are specific for each pair. Processing also sets the IPC_PEER_COMP_ACTIONS_RST_PHASE2 bit indication in the follower's CSR to notify the follower that the leader has completed Reset Phase 2 actions. Thereafter, the process transitions to the wait state of Reset Phase 2 (320).

Referring back to processing block 314, if there is no indication that follower has completed Reset Phase 1 actions, processing logic in the leader checks whether the follower has completed Reset Phase 2 actions (processing block 316). In one embodiment, this is done by checking the IPC_PEER_COMP_ACTIONS_RST_PHASE2 bit indication in the leader's CSR. If the bit was set by the follower, in one embodiment, the leader clears IPC_PEER_COMP_ACTIONS_RST_PHASE2 and IPC_PEER_QUERIED_IP_COMP_ACTIONS_RST_PHASE bits in its own CSR and sets the IPC_PEER_COMP_ACTIONS_RST_PHASE1 bit indication in the follower's CSR to indicate to the follower that the leader has completed Reset Phase 1 actions (processing block 317), and then transitions to the wait state of Reset Phase 1 (310).

If the follower has not completed Reset Phase 2 actions as determined at processing block 316, the process transitions to processing block 318 where processing logic tests whether the follower has requested the reset phase state of the leader. In one embodiment, the leader checks the IPC_PEER_QUERIED_IP_COMP_ACTIONS_RST_PHASE bit indication from its CSR to determine if the follower had requested its reset phase state. If it had, then processing logic clears the request and notifies the follower that it has completed Reset Phase 1 actions. In one embodiment, the request is cleared by clearing the IPC_PEER_QUERIED_IP_COMP_ACTIONS_RST_PHASE bit indication in its CSR. In one embodiment, the leader notifies the follower of its reset phase state by setting the IPC_PEER_COMP_ACTIONS_RST_PHASE1 bit indication in the follower's CSR register. Once this has been completed, the process transitions to the wait state of Reset Phase 1 (310).

At the wait state of Reset Phase 2 (320), processing logic waits for a CSR interrupt to occur indicating that some bit in the CSR register has been set and not handled yet. When a CSR interrupt occurs, the process transitions to processing block 321 where processing logic clears the CSR interrupt and copies the CSR values to local variable storage for analysis.

Processing logic tests whether the follower has indicated that it has completed both Reset Phase 1 actions and Reset Phase 2 actions (processing block 322). This is done by checking whether both of the IPC_PEER_COMP_ACTIONS_RST_PHASE1 and IPC_PEER_COMP_ACTIONS_RST_PHASE2 bit indications are set. If they are both set, the processing transitions to processing block 323 where processing logic clears both bit indications, IPC_PEER_COMP_ACTIONS_RST_PHASE1 and IPC_PEER_COMP_ACTIONS_RST_PHASE2, and queries the follower to determine in what state the follower is currently. In one embodiment, this is done by the leader setting the IPC_PEER_QUERIED_IP_COMP_ACTIONS_RST_PHASE bit indication in the follower's CSR. After doing so, the process transitions to processing block 328.

At processing block 328, processing logic tests whether the leader was queried by the follower as to what reset phase the leader is currently in. In one embodiment, this performed by the leader checking the IPC_PEER_QUERIED_IP_COMP_ACTIONS_RST_PHASE bit indication in its CSR. If queried, processing logic clears the IPC_PEER_QUERIED_IP_COMP_ACTIONS_RST_PHASE bit indication and notifies the follower that it has completed Reset Phase 2 actions (processing block 329). In one embodiment, the leader notifies the follower that it has completed Reset Phase 2 actions by setting the CSR bit corresponding to the IPC_PEER_QUERIED_IP_COMP_ACTIONS_RST_PHASE2 bit indication in the follower. Thereafter, the process transitions to the wait state of Reset Phase 2 (320). If the leader was not queried as to its current reset phase state, the process returns to the wait state of Reset Phase 2 (320).

Referring back to processing block 322, if either of the IPC_PEER_COMP_ACTIONS_RST_PHASE1 and IPC_PEER_COMP_ACTIONS_RST_PHASE2 bit indications is not set, the process transitions to processing block 324 where processing logic tests whether the follower is in Reset Phase 1 and needs to transition to Reset Phase 2. In one embodiment, this is done by the leader checking the IPC_PEER_COMP_ACTIONS_RST_PHASE1 bit indication that is set by the follower in the leader's CSR indicating that the follower has completed Reset Phase 1 actions. If so, the process transitions to processing block 325 where processing logic in the leader clears the IPC_PEER_COMP_ACTIONS_RST_PHASE1 bit indication in its CSR set by the follower and the IPC_PEER_QUERIED_IP_COMP_ACTIONS_RST_PHASE bit indication and indicates to the follower that the leader has completed Reset Phase 2 actions. In one embodiment, the leader indicates to the follower that it has completed Reset Phase 2 actions by setting the IPC_PEER_COMP_ACTIONS_RST_PHASE2 bit indication in the CSR of the follower. Thereafter, the process transitions to the wait state of Reset Phase 2 (320).

Referring back to processing block 324, if the follower is not in Reset Phase 1, the processing logic in the leader checks whether the follower has completed Reset Phase 2 actions (processing block 326). In one embodiment, this is done by checking the IPC_PEER_COMP_ACTIONS_

RST_PHASE2 bit indication. If processing logic determines that the follower has completed Reset Phase 2 actions, processing logic clears the IPC_PEER_COMP_ACTIONS_RST_PHASE2 bit indication and transitions to processing block 340 where processing logic checks whether the follower has asked in which reset phase state the leader is. If the follower has not asked in which reset phase state the leader is, the leader moves to the operational phase (350). If the follower has requested the reset phase status of the leader, processing logic clears the request and notifies the peer that it has completed Reset Phase 2 actions (processing block 341. In one embodiment, the request is cleared by the leader clearing the IPC_PEER_QUERIED_IP_COMP_ACTIONS_RST_PHASE bit indication in the CSR of the follower. In one embodiment, the leader notifies the follower of the reset phase state it's in by setting the IPC_PEER_COMP_ACTIONS_RST_PHASE2 bit indication in the CSR register of the follower. Thereafter, the process transitions to the beginning of the operational phase 350.

Referring back to block 326, if processing logic determines that the follower has not completed Reset Phase 2 actions, the process transitions to processing block 328 where processing logic checks whether the follower has asked in which reset phase state the leader is in. If not, the process transitions to the wait state of Reset Phase 2 (320). If the follower has asked, the process transitions to processing block 329 where processing logic clears the request and notifies the peer that it has completed Reset Phase 2 actions (processing block 329). In one embodiment, the request is cleared by the leader clearing the IPC_PEER_QUERIED_IP_COMP_ACTIONS_RST_PHASE bit indication in the CSR of the follower. In one embodiment, the leader notifies the follower of the reset phase state it's in by setting the IPC_PEER_COMP_ACTIONS_RST_PHASE2 bit indication in the CSR register of the follower. Thereafter, the process transitions to the beginning of Reset Phase 2 (320).

FIG. 4 is the process performed by the follower. Referring to FIG. 4, the process performed by the leader starts at initialization (401). During initialization (401), processing logic of the follower disables the interrupts from both doorbells and disables interrupts from its CSR (processing block 402). In one embodiment, the interrupts from the CSR are interrupts from the hardware endpoint logic that notifies the processing logic of the core that different bits in its CSR have been set.

Thereafter, processing logic of the follower clears the CSR bits corresponding to the internal states (e.g., an indication of whether the leader has completed Reset Phase 1 actions, an indication of whether the leader has completed Reset Phase 2 actions, other CSR bits), clears the outgoing messages in all the firmware (FW) first-in first out buffers (FIFOs) in the memory of the follower, consumes or drops all incoming messages in the FIFOs, clears-by-1 the CSR bit indicating that the leader queried the follower to determine in which reset phase state the follower currently resides, and sets an indication in the leader indicating that the follower has completed Reset Phase 1 actions (processing block 403). In one embodiment, this indication is referred to in FIG. 4 as the IPC_PEER_COMP_ACTIONS_RST_PHASE1 bit indication.

Then the process transitions to processing block 404 where processing logic tests whether the follower is entering reset or powering down. If it is, the process ends. If not, the process transitions to processing block 405 where processing logic enables interrupts from its CSR. After enabling the CSR interrupts, the process transitions to Reset Phase 1 wait state (410).

At Reset Phase 1 (410), processing logic waits for a CSR interrupt to occur indicating that some bit in the CSR register has been set and not handled yet. When a CSR interrupt occurs, the process transitions to processing block 411 where processing logic clears the CSR interrupt and copies the CSR values to local variable storage for analysis. Then processing logic in the follower tests whether the leader has indicated that it has completed both Reset Phase 1 actions and Reset Phase 2 actions (processing block 412). This is done by checking whether the IPC_PEER_COMP_ACTIONS_RST_PHASE1 and IPC_PEER_COMP_ACTIONS_RST_PHASE2 bit indications are set in the follower's CSR. If they are both set, the process transitions to processing block 413 where processing logic clears both the IPC_PEER_COMP_ACTIONS_RST_PHASE1 and IPC_PEER_COMP_ACTIONS_RST_PHASE2 bit indications, and queries the leader as to the reset phase state in which the leader resides. To query the leader's reset phase state, processing logic in the follower sets an indication in the leader. In one embodiment, this is done by setting the IPC_PEER_QUERIED_IP_COMP_ACTIONS_RST_PHASE bit indication in the leader's CSR. After doing so, the process transitions to processing block 418.

At processing block 418, processing logic in the follower determines whether the follower was queried by the leader as to its reset phase state. In one embodiment, this is performed by the follower checking the IPC_PEER_QUERIED_IP_COMP_ACTIONS_RST_PHASE bit indication in its CSR. If so, processing logic clears its IPC_PEER_QUERIED_IP_COMP_ACTIONS_RST_PHASE bit indication and notifies the leader of its current reset phase which is reset phase 1 (processing block 419). In one embodiment, the follower notifies the leader of its reset phase state by setting the CSR bit corresponding to the IPC_PEER_COMP_ACTIONS_RST_PHASE1 bit indication in the leader's CSR. Thereafter, the process transitions to the wait state of Reset Phase 1 (410). Referring back to processing block 418, if the leader did not query the follower as to its current reset phase state, the process transitions to the wait state of Reset Phase 1 (410).

Referring back to processing block 412, if either of the IPC_PEER_COMP_ACTIONS_RST_PHASE1 and IPC_PEER_COMP_ACTIONS_RST_PHASE2 indications is not set, the process transitions to processing block 414 where processing logic tests whether the leader has completed Reset Phase 1 actions. In one embodiment, this is done by the follower checking the IPC_PEER_COMP_ACTIONS_RST_PHASE1 bit indication that is set by the leader in the follower's CSR indicating that the leader has completed Reset Phase 1 actions. If the follower determines that the leader has completed Reset Phase 1 actions, the process transitions to processing block 415 where processing logic in the follower clears the IPC_PEER_COMP_ACTIONS_RST_PHASE1 and IPC_PEER_QUERIED_IP_COMP_ACTIONS_RST_PHASE bit indications in its CSR and indicates to the leader that the follower has completed Reset Phase 1 actions. In one embodiment, the follower indicates to the leader that it has completed Reset Phase 1 actions by setting the IPC_PEER_COMP_ACTIONS_RST_PHASE1 bit indication in the CSR of the leader. Thereafter, the process transitions to the wait state of Reset Phase 1 (410).

Referring back to processing block 414, if the leader is not in Reset Phase 1, processing logic in the follower checks whether the leader has completed Reset Phase 2 actions (processing block 416). In one embodiment, this is done by the follower checking the IPC_PEER_COMP_ACTIONS_

RST_PHASE2 bit indication in the follower's CSR that is set by the leader. If so, processing logic clears the IPC_PEER_COMP_ACTIONS_RST_PHASE2 bit indication in the follower's CSR (processing block 417) and then the process transitions to processing block 420.

At processing block 420, processing logic in the follower clears an incoming doorbell and all the bit indications in its CSR except the IPC_PEER_COMP_ACTIONS_RST_PHASE1 and IPC_PEER_COMP_ACTIONS_RST_PHASE2 bit indications, and optionally one or more custom bits (depending on their role), which are described above. Processing logic also sets the IPC_PEER_COMP_ACTIONS_RST_PHASE2 bit indication in the leader's CSR to notify the leader that the follower has completed Reset Phase 2 actions. Thereafter, the process transitions to the operational phase (421). Note that even though the follower is in the operational phase, in one embodiment, the leader must send the first in-band message before the follower can send a message. In one embodiment, the leader sends a dummy message as the first message. This allows the follower to begin sending messages. This, in order to prevent a corner case in which the follower sends the message first, goes through reset, and reaches operational phase again without the leader even knowing about it.

Referring back to processing block 416, f the follower determines the leader is not in Reset Phase 2, the process transitions to processing block 418 where processing logic tests whether the leader has requested the reset phase state of the follower. In one embodiment, the follower checks the IPC_PEER_QUERIED_IP_COMP_ACTIONS_RST_PHASE bit indication from its CSR to determine if the leader had requested the follower's reset phase state. If it had, then processing logic in the follower clears the request and notifies the leader that it has completed Reset Phase 1 actions. In one embodiment, the follower clears the request by clearing IPC_PEER_QUERIED_IP_COMP_ACTIONS_RST_PHASE bit indication in its CSR. In one embodiment, the follower notifies the leader of its reset phase state by setting the IPC_PEER_COMP_ACTIONS_RST_PHASE1 in the CSR register of the leader. Once this has been completed, the process transitions to the wait state of Reset Phase 1 (410).

Thus, embodiments described herein include one or more of: handling special cases for resets within resets or interleaved resets, dropping of all stale messages, avoiding drop of valid messages, avoiding deadlocks, avoiding livelocks, allowing asynchronous reset entry by any processing unit, simple indications of disabling and/or unavailability, uniform handling for processing unit reset, disabling, processing unit non-availability and/or reset only of a communication channel, and discovery without forcing a pre-defined reset exit order.

Furthermore, reads for synchronizing reset are avoided due to issues mentioned above. Similarly, timeouts and/or retries are also avoided due to issues mentioned above.

Figure 5:
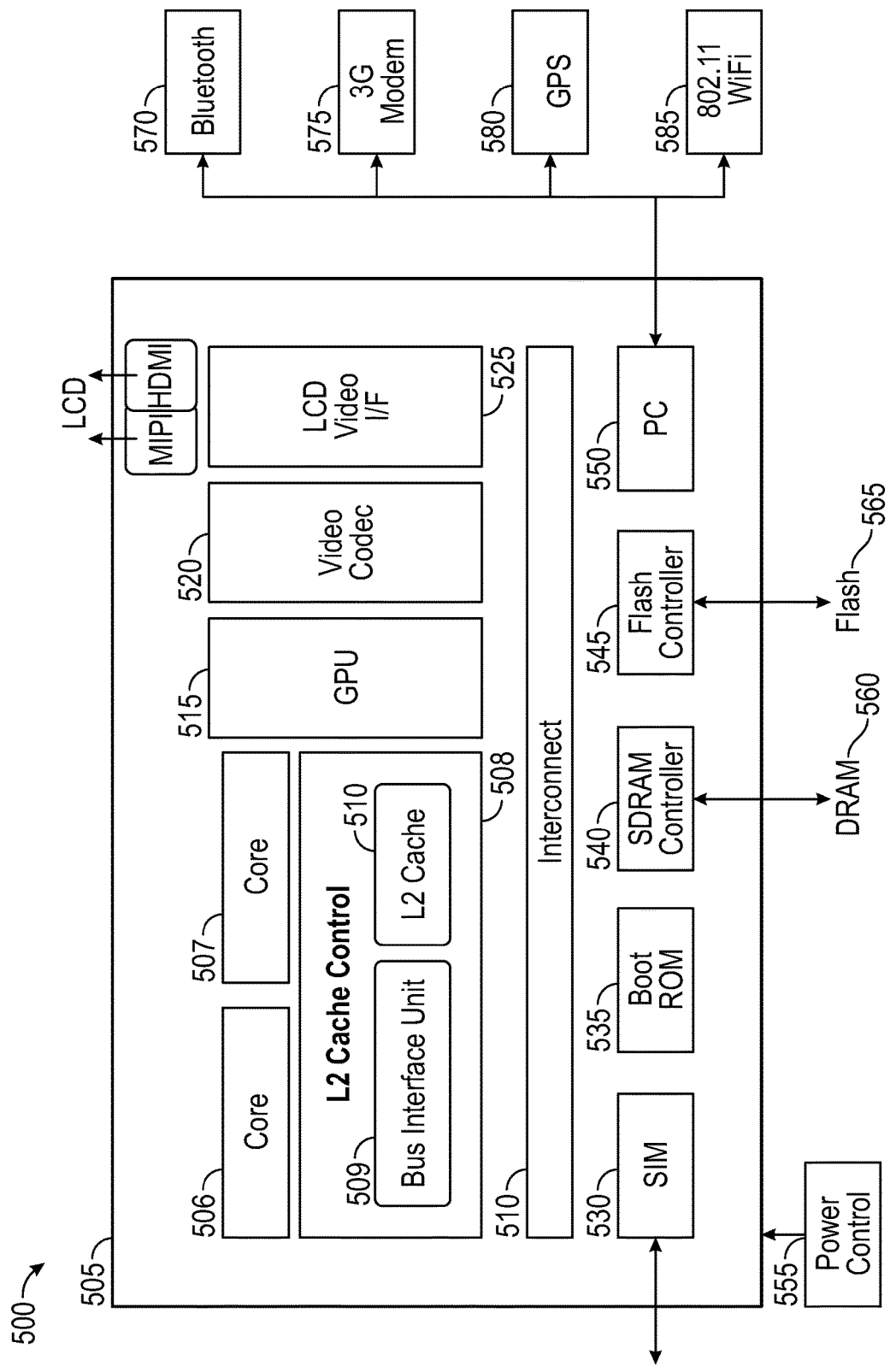
FIG. 5 illustrates an embodiment of a system on-chip (SOC) design.

FIG. 5 illustrates an embodiment of a system on-chip (SOC) design in accordance with the inventions is depicted. As a specific illustrative example, SOC 500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

In one embodiment, SOC 500 includes 2 cores, namely 506 and 507. Similar to the discussion above, cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 510 to communicate with other parts of system 500. Interconnect 510 includes an on-chip interconnect, such as an IOSF, AMBA, or other interconnect discussed herein, which potentially implements one or more aspects of the described invention.

Interface 510 provides communication channels to the other components, such as a Subscriber Identity Module (SIM) 530 to interface with a SIM card, a boot ROM 535 to hold boot code for execution by cores 506 and 507 to initialize and boot SOC 500, a SDRAM controller 540 to interface with external memory (e.g., DRAM 560), a flash controller 545 to interface with non-volatile memory (e.g., Flash 565), a peripheral control 550 (e.g. Serial Peripheral Interface) to interface with peripherals, video codecs 520 and Video interface 525 to display and receive input (e.g., touch enabled input), GPU 515 to perform graphics related computations, etc. Any of these interfaces may incorporate aspects of the invention described herein.

In addition, the system illustrates peripherals for communication, such as a Bluetooth module 570, 3G modem 575, GPS 585, and WiFi 585. Note as stated above, a UE includes a radio for communication. As a result, these peripheral communication modules are not all required. However, in a UE some form a radio for external communication is to be included.

Figure 6:
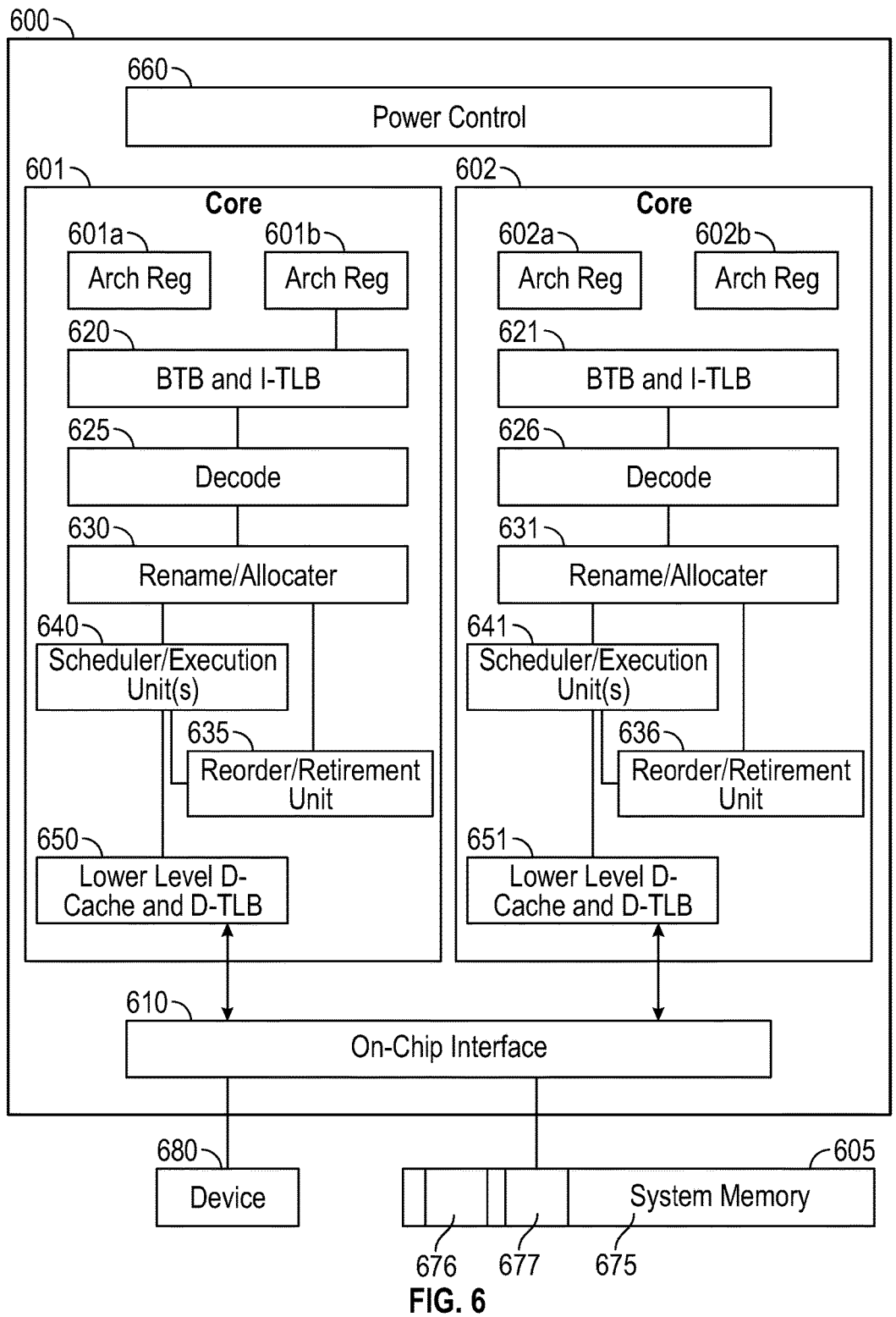
FIG. 6 illustrates an embodiment of a block diagram for a computing system including a multicore processor.

FIG. 6 illustrates an embodiment of a block diagram for a computing system including a multicore processor. Referring to FIG. 6, processor 600 includes any processor or processing device, such as a microprocessor, an embedded processor, a digital signal processor (DSP), a network processor, a handheld processor, an application processor, a co-processor, a system on a chip (SOC), or other device to execute code. In one embodiment, processor 600 includes at least two cores, namely cores 601 and 602, which may include asymmetric cores or symmetric cores (the illustrated embodiment). However, processor 600 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 600, as illustrated in FIG. 6, includes two cores—core 601 and 602. Here, core 601 and 602 are considered symmetric cores, i.e. cores with the same configurations, functional units, and/or logic. In another embodiment, core 601 includes an out-of-order processor core, while core 602 includes an in-order processor core. However, cores 601 and 602 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 601 are described in further detail below, as the units in core 602 operate in a similar manner in the depicted embodiment.

As depicted, core 601 includes two hardware threads 601a and 601b, which may also be referred to as hardware thread slots 601a and 601b. Therefore, software entities, such as an operating system, in one embodiment potentially view processor 600 as four separate processors, i.e., four logical processors or processing elements capable of executing four software threads concurrently. As alluded to above, a first thread is associated with architecture state registers 601a, a second thread is associated with architecture state registers 601b, a third thread may be associated with architecture state registers 602a, and a fourth thread may be associated with architecture state registers 602b. Here, each of the architecture state registers (601a, 601b, 602a, and 602b) may be referred to as processing elements, thread slots, or thread units, as described above. As illustrated, architecture state registers 601a are replicated in architecture state registers 601b, so individual architecture states/contexts are capable of being stored for logical processor 601a and logical processor 601b. In core 601, other smaller resources, such as instruction pointers and renaming logic in allocator and renamer block 630 may also be replicated for threads 601a and 601b. Some resources, such as re-order buffers in reorder/retirement unit 635, ILTB 620, load/store buffers, and queues may be shared through partitioning. Other resources, such as general purpose internal registers, page-table base register(s), low-level data-cache and data-TLB 615, execution unit(s) 640, and portions of out-of-order unit 635 are potentially fully shared.

Processor 600 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 601 includes a simplified, representative out-of-order (OOO) processor core. But an in-order processor may be utilized in different embodiments. The OOO core includes a branch target buffer 620 to predict branches to be executed/taken and an instruction-translation buffer (I-TLB) 620 to store address translation entries for instructions.

Core 601 further includes decode module 625 coupled to fetch unit 620 to decode fetched elements. Fetch logic, in one embodiment, includes individual sequencers associated with thread slots 601a, 601b, respectively. Usually core 601 is associated with a first ISA, which defines/specifies instructions executable on processor 600. Often machine code instructions that are part of the first ISA include a portion of the instruction (referred to as an opcode), which references/specifies an instruction or operation to be performed. Decode logic 625 includes circuitry that recognizes these instructions from their opcodes and passes the decoded instructions on in the pipeline for processing as defined by the first ISA. For example, as discussed in more detail below decoders 625, in one embodiment, include logic designed or adapted to recognize specific instructions, such as transactional instruction. As a result of the recognition by decoders 625, the architecture or core 601 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 626, in one embodiment, recognize the same ISA (or a subset thereof). Alternatively, in a heterogeneous core environment, decoders 626 recognize a second ISA (either a subset of the first ISA or a distinct ISA).

In one example, allocator and renamer block 630 includes an allocator to reserve resources, such as register files to store instruction processing results. However, threads 601a and 601b are potentially capable of out-of-order execution, where allocator and renamer block 630 also reserves other resources, such as reorder buffers to track instruction results. Unit 630 may also include a register renamer to rename program/instruction reference registers to other registers internal to processor 600. Reorder/retirement unit 635 includes components, such as the reorder buffers mentioned above, load buffers, and store buffers, to support out-of-order execution and later in-order retirement of instructions executed out-of-order.

Scheduler and execution unit(s) block 640, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 650 are coupled to execution unit(s) 640. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 601 and 602 share access to higher-level or further-out cache, such as a second level cache associated with on-chip interface 610. Note that higher-level or further-out refers to cache levels increasing or getting further way from the execution unit(s). In one embodiment, higher-level cache is a last-level data cache—last cache in the memory hierarchy on processor 600—such as a second or third level data cache. However, higher level cache is not so limited, as it may be associated with or include an instruction cache. A trace cache—a type of instruction cache—instead may be coupled after decoder 625 to store recently decoded traces. Here, an instruction potentially refers to a macro-instruction (i.e. a general instruction recognized by the decoders), which may decode into a number of micro-instructions (micro-operations).

In the depicted configuration, processor 600 also includes on-chip interface module 610. Historically, a memory controller, which is described in more detail below, has been included in a computing system external to processor 600. In this scenario, on-chip interface 610 is to communicate with devices external to processor 600, such as system memory 675, a chipset (often including a memory controller hub to connect to memory 675 and an I/O controller hub to connect peripheral devices), a memory controller hub, a northbridge, or other integrated circuit. And in this scenario, bus 605 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 675 may be dedicated to processor 600 or shared with other devices in a system. Common examples of types of memory 675 include DRAM, SRAM, non-volatile memory (NV memory), and other known storage devices. Note that device 680 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 600. For example in one embodiment, a memory controller hub is on the same package and/or die with processor 600. Here, a portion of the core (an on-core portion) 610 includes one or more controller(s) for interfacing with other devices such as memory 675 or a graphics device 680. The configuration including an interconnect and controllers for interfacing with such devices is often referred to as an on-core (or un-core configuration). As an example, on-chip interface 610 includes a ring interconnect for on-chip communication and a high-speed serial point-to-point link 605 for off-chip communication. Yet, in the SOC environment, even more devices, such as the network interface, co-processors, memory 675, graphics processor 680, and any other known computer devices/interface may be integrated on a single die or integrated circuit to provide small form factor with high functionality and low power consumption. These devices, including the processor cores, can use the interconnect described herein for communication (e.g., communication channel 103, an IPC communication channel, etc.).

In a first example embodiment, an apparatus comprises: a pair of processing units to communicate with each other in peer-to-peer communication using write operations, wherein each processing unit in the pair comprises a communication unit to transmit information one processing unit in the pair to the other processing unit in the pair; memory to store reset synchronization information and message information; and processing logic to perform write-only reset synchronization between itself and the other processing unit based on bit indications set in the memory.

In another example embodiment, the subject matter of the first example embodiment can optionally include that the memory includes storage for a set of bits, one or more bits of the set of bits representing an indication, set by the other processing unit, regarding reset synchronization and one or more bits of the set of bits being unrelated to reset synchronization, sent by the other processing unit.

In another example embodiment, the subject matter of the first example embodiment can optionally include that a first bit of the set of bits is an indication that the other processing unit will not transmit any more transactions unrelated to reset synchronization. In another example embodiment, the subject matter of this embodiment can optionally include that a second bit of the set of bits is an indication that the other processing unit discarded unprocessed messages sent from the one processing unit unrelated to reset synchronization. In another example embodiment, the subject matter of this embodiment can optionally include that a third bit of the set of bits is a request to the one processing unit from the other processing unit to disambiguate between a setting made with respect to the first and second bits based on which of the first and second bits was last set.

In another example embodiment, the subject matter of the first example embodiment can optionally include that the processing logic of the one processing unit synchronizes reset between itself and the other processing unit by: setting a first indication in the other processing unit to indicate that the one processing unit has disabled outgoing traffic unrelated to reset synchronization, reading from the memory a second indication set by the other processing unit that its outgoing traffic unrelated to reset synchronization has been disabled, in response to reading the second indication clearing message information stored in the memory unrelated to reset synchronization and received from the other processing unit, setting a third indication in the other processing unit to indicate that the one processing unit has cleared residual incoming traffic unrelated to reset synchronization, reading from the memory a fourth indication set by the other processing unit indicating that it has cleared incoming message information stored in the memory unrelated to reset synchronization received from the one processing unit, and resuming communication with the other processing unit.

In another example embodiment, the subject matter of the first example embodiment can optionally include that the processing logic of the other processing unit synchronizes reset between the other processing unit and the one processing unit by: setting a first indication in the first processing unit to indicate the other processing unit has disabled outgoing traffic unrelated to reset synchronization, reading from the memory a second indication set by the one processing unit that its outgoing traffic unrelated to reset synchronization has been disabled, reading from the memory a third indication set by the one processing unit indicating that the one processing unit has cleared message information stored in the memory unrelated to reset synchronization and received from the other processing unit, in response to reading the third indication, clearing message information stored in the memory unrelated to reset synchronization and received from the one processing unit, setting a fourth indication in the one processing unit to indicate the other processing unit has cleared residual incoming traffic unrelated to reset synchronization, and resuming communication with the one processing unit after receiving at least one incoming message from the one processing unit.

In another example embodiment, the subject matter of the first example embodiment can optionally include that when receiving the second indication that the other processing unit has disabled its outgoing traffic unrelated to reset synchronization, the one processing unit reports its current reset synchronization state again to the other processing unit.

In another example embodiment, the subject matter of the first example embodiment can optionally include that when receiving the indication that the one processing unit has disabled its outgoing traffic unrelated to reset synchronization, the other processing unit reports its current reset synchronization state again to the one processing unit.

In another example embodiment, the subject matter of the first example embodiment can optionally include that the pair of processing units are processing cores in an integrated circuit.

In another example embodiment, the subject matter of the first example embodiment can optionally include that the pair of processing units are not part of one integrated circuit.

In another example embodiment, the subject matter of the first example embodiment can optionally include that the one processing unit sets the bit indications in the other processing unit by writing a bit in a control status register (CSR) register in the other processing unit.

In another example embodiment, the subject matter of the first example embodiment can optionally include that the currently stored message information comprises one or more of a message, peer-related request information, and peer-related status information.

In a second example embodiment, a method for synchronizing reset between a first peer and a second peer that communicate using write operations comprises: for the first peer, setting a first indication in the second processing unit to indicate the first peer has disabled outgoing traffic unrelated to reset synchronization, reading from the memory a second indication set by the second peer that its outgoing traffic unrelated to reset synchronization has been disabled, in response to reading the second indication, clearing message information stored in the memory unrelated to reset synchronization and received from the second peer, setting a third indication in the second peer using the communication unit to indicate the first peer has cleared residual incoming traffic unrelated to reset synchronization, reading from the memory a fourth indication set by the second peer indicating that it has cleared incoming message information stored in the memory unrelated to reset synchronization received from the first peer, and resuming communication with the second peer.

In another example embodiment, the subject matter of the second example embodiment can optionally include that for the second peer, setting a first indication in the first peer to indicate the second peer has disabled outgoing traffic unrelated to reset synchronization; reading from the memory a second indication set by the first peer that its outgoing traffic unrelated to reset synchronization has been disabled; reading from the memory a third indication set by the first peer indicating that it has cleared any message information stored in the memory unrelated to reset synchronization and received from the second peer; in response to reading the third indication, clearing message information stored in the memory unrelated to reset synchronization and received from the first peer; setting a fourth indication in the first peer using the communication unit to indicate the second peer has cleared residual incoming traffic unrelated to reset synchronization; and resuming communication with the first peer after receiving at least one incoming message from the first peer.

In another example embodiment, the subject matter of the second example embodiment can optionally include one or both of the first and second peers reporting current reset synchronization state again to the other peer after receiving a report that the peer's outgoing traffic unrelated to reset synchronization has been disabled.

In another example embodiment, the subject matter of the second example embodiment can optionally include one of the first and second peers clearing currently stored message information received from the other of the first and second peers.

In another example embodiment, the subject matter of the second example embodiment can optionally include setting any of the first, second, third or fourth indications comprises writing a bit in a control status register (CSR) register in the respective first or second peer.

In another example embodiment, the subject matter of the second example embodiment can optionally include that the currently stored message information comprises of one or more of a message, peer-related request information, and peer-related status information.

In another example embodiment, the subject matter of the second example embodiment can optionally include maintaining reset synchronization when one or more resets by one or both of the first and second peers occurs during the reset synchronization. In another example embodiment, the subject matter of this embodiment can optionally include that the one or more resets comprises interleaved or simultaneous resets by both peers.

In a third example embodiment, an article of manufacture has one or more non-transitory computer readable storage media storing instructions which when executed by first and second peers cause the first and second peers to perform a method for synchronizing reset between the first and second peers that communicate with each other using write operations, where the method comprises: for the first peer, setting a first indication in the second processing unit to indicate the first peer has disabled outgoing traffic unrelated to reset synchronization, reading from the memory a second indication set by the second peer that its outgoing traffic unrelated to reset synchronization has been disabled, in response to reading the second indication, clearing message information stored in the memory unrelated to reset synchronization and received from the second peer, setting a third indication in the second peer using the communication unit to indicate the first peer has cleared residual incoming traffic unrelated to reset synchronization, reading from the memory a fourth indication set by the second peer indicating that it has cleared incoming message information stored in the memory unrelated to reset synchronization received from the first peer, and resuming communication with the second peer.

In another example embodiment, the subject matter of the third example embodiment can optionally include that the method further comprises: for the second peer, setting a first indication in the first peer to indicate the second peer has disabled outgoing traffic unrelated to reset synchronization, reading from the memory a second indication set by the first peer that its outgoing traffic unrelated to reset synchronization has been disabled, reading from the memory a third indication set by the first peer indicating that it has cleared message information stored in the memory unrelated to reset synchronization and received from the second peer, in response to reading the third indication, clearing message information stored in the memory unrelated to reset synchronization and received from the first peer, setting a fourth indication in the first peer using the communication unit to indicate the second peer has cleared residual incoming traffic unrelated to reset synchronization, resuming communication with the one processing unit after receiving at least one incoming message from the first peer.

In another example embodiment, the subject matter of the third example embodiment can optionally include that the method further comprises one or both of the first and second peers reporting current reset synchronization state again to the other peer when receiving a report that the other peer's outgoing traffic unrelated to reset synchronization has been disabled.

In another example embodiment, the subject matter of the second example embodiment can optionally include that the method further comprises one or both of the first and second peers clearing currently stored message information received from the other of the first and second peers.

Some portions of the detailed descriptions are presented herein in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a pair of processing units which communicate with each other in peer-to-peer communication using write operations, wherein each processing unit in the pair comprises:
   a communication unit to transmit information from one processing unit in the pair to the other processing unit in the pair;
   memory to store reset synchronization information and message information; and
   processing logic to perform write-only reset synchronization between itself and the other processing unit based on bit indications set in the memory without the processing logic performing a reset related read operation on a memory of the other processing unit, wherein at least one of the bit indications is a result of a write operation performed by the other processing unit.

2. The apparatus defined in claim 1 wherein the memory includes storage for a set of bits, one or more bits of the set of bits representing an indication, set by the other processing unit, regarding reset synchronization and one or more bits of the set of bits being unrelated to reset synchronization, sent by the other processing unit.

3. The apparatus defined in claim 2 wherein a first bit of the set of bits is an indication that the other processing unit will not transmit any more transactions unrelated to reset synchronization.

4. The apparatus defined in claim 3 wherein a second bit of the set of bits is an indication that the other processing unit discarded unprocessed messages sent from the one processing unit unrelated to reset synchronization.

5. The apparatus defined in claim 4 wherein a third bit of the set of bits is a request to the one processing unit from the other processing unit to disambiguate between a setting made with respect to the first and second bits based on which of the first and second bits was last set.

6. The apparatus defined in claim 4 wherein the processing logic of the one processing unit synchronizes reset between itself and the other processing unit by:
   setting a first indication in the other processing unit to indicate that the one processing unit has disabled outgoing traffic unrelated to reset synchronization,
   reading from the memory a second indication set by the other processing unit that its outgoing traffic unrelated to reset synchronization has been disabled,
   in response to reading the second indication, clearing message information stored in the memory unrelated to reset synchronization and received from the other processing unit,
   setting a third indication in the other processing unit to indicate that the one processing unit has cleared residual incoming traffic unrelated to reset synchronization, reading from the memory a fourth indication set by the other processing unit indicating that it has cleared incoming message information stored in the memory unrelated to reset synchronization received from the one processing unit, and resuming communication with the other processing unit.

7. The apparatus defined in claim 6 wherein when receiving the second indication that the other processing unit has disabled its outgoing traffic unrelated to reset synchronization, the one processing unit reports its current reset synchronization state again to the other processing unit.

8. The apparatus defined in claim 6 wherein the currently stored message information comprises one or more of a message, peer-related request information, and peer-related status information.

9. The apparatus defined in claim 4 wherein the processing logic of the other processing unit synchronizes reset between the other processing unit and the one processing unit by:

setting a first indication in the first processing unit to indicate the other processing unit has disabled outgoing traffic unrelated to reset synchronization, reading from the memory a second indication set by the one processing unit that its outgoing traffic unrelated to reset synchronization has been disabled, reading from the memory a third indication set by the one processing unit indicating that the one processing unit has cleared message information stored in the memory unrelated to reset synchronization and received from the other processing unit, in response to reading the third indication, clearing message information stored in the memory unrelated to reset synchronization and received from the one processing unit, setting a fourth indication in the one processing unit to indicate the other processing unit has cleared residual incoming traffic unrelated to reset synchronization, and resuming communication with the one processing unit after receiving at least one incoming message from the one processing unit.

10. The apparatus defined in claim 9 wherein when receiving the indication that the one processing unit has disabled its outgoing traffic unrelated to reset synchronization, the other processing unit reports its current reset synchronization state again to the one processing unit.

11. The apparatus defined in claim 1 wherein the pair of processing units are processing cores in an integrated circuit.

12. The apparatus defined in claim 1 wherein the pair of processing units are not part of one integrated circuit.

13. The apparatus defined in claim 1 wherein the one processing unit sets the bit indications in the other processing unit by writing a bit in a control status register (CSR) register in the other processing unit.

14. A method for synchronizing reset between a first peer and a second peer that communicate using write operations, the method comprising:

for the first peer,
  setting a first indication in the second processing unit to indicate the first peer has disabled outgoing traffic unrelated to reset synchronization,
  reading from the memory a second indication set by the second peer that its outgoing traffic unrelated to reset synchronization has been disabled,
  in response to reading the second indication, clearing message information stored in the memory unrelated to reset synchronization and received from the second peer,
  setting a third indication in the second peer using the communication unit to indicate the first peer has cleared residual incoming traffic unrelated to reset synchronization,
  reading from the memory a fourth indication set by the second peer indicating that it has cleared incoming message information stored in the memory unrelated to reset synchronization received from the first peer, and
  resuming communication with the second peer.

15. The method defined in claim 14 further comprising:
for the second peer,
  setting a first indication in the first peer to indicate the second peer has disabled outgoing traffic unrelated to reset synchronization;
  reading from the memory a second indication set by the first peer that its outgoing traffic unrelated to reset synchronization has been disabled;
  reading from the memory a third indication set by the first peer indicating that it has cleared message information stored in the memory unrelated to reset synchronization and received from the second peer;
  in response to reading the third indication, clearing message information stored in the memory unrelated to reset synchronization and received from the first peer;
  setting a fourth indication in the first peer using the communication unit to indicate the second peer has cleared residual incoming traffic unrelated to reset synchronization; and
  resuming communication with the first peer after receiving at least one incoming message from the first peer.

16. The method defined in claim 15 further comprising one or both of the first and second peers reporting current reset synchronization state again to the other peer after receiving a report from the other peer that the other peer's outgoing traffic unrelated to reset synchronization has been disabled.

17. The method defined in claim 15 further comprising one of the first and second peers clearing currently stored message information received from the other of the first and second peers.

18. The method defined in claim 15 wherein setting any of the first, second, third or fourth indications comprises writing a bit in a control status register (CSR) register in the respective first or second peer.

19. The method defined in claim 15 wherein the currently stored message information comprises of one or more of a message, peer-related request information, and peer-related status information.

20. The method defined in claim 15 further comprising maintaining reset synchronization when one or more resets by one or both of the first and second peers occurs during the reset synchronization.

21. The method defined in claim 14 wherein the one or more resets comprises interleaved or simultaneous resets by both peers.

22. An article of manufacture having one or more non-transitory computer readable storage media storing instructions which when executed by first and second peers cause the first and second peers to perform a method for synchronizing reset between the first and second peers that communicate with each other using write operations, the method comprising:
for the first peer,
  setting a first indication in the second processing unit to indicate the first peer has disabled outgoing traffic unrelated to reset synchronization, reading from the memory a second indication set by the second peer that its outgoing traffic unrelated to reset synchronization has been disabled, in response to reading the second indication, clearing message information stored in the memory unrelated to reset synchronization and received from the second peer, setting a third indication in the second peer using the communication unit to indicate the first peer has cleared residual incoming traffic unrelated to reset synchronization, reading from the memory a fourth indication set by the second peer indicating that it has cleared incoming message information stored in the memory unrelated to reset synchronization received from the first peer, and resuming communication with the second peer.

23. The article of manufacture defined in claim 22 wherein the method further comprises:

for the second peer, setting a first indication in the first peer to indicate the second peer has disabled outgoing traffic unrelated to reset synchronization, reading from the memory a second indication set by the first peer that its outgoing traffic unrelated to reset synchronization has been disabled, reading from the memory a third indication set by the first peer indicating that it has cleared message information stored in the memory unrelated to reset synchronization and received from the second peer, in response to reading the third indication, clearing message information stored in the memory unrelated to reset synchronization and received from the first peer, setting a fourth indication in the first peer using the communication unit to indicate the second peer has cleared residual incoming traffic unrelated to reset synchronization, and resuming communication with the one processing unit after receiving at least one incoming message from the first peer.

24. The article of manufacture defined in claim 23 further comprising one or both of the first and second peers reporting current reset synchronization state again to the other peer when receiving a report that outgoing traffic of the other peer unrelated to reset synchronization has been disabled.

25. The article of manufacture defined in claim 23 wherein the method further comprises one or both of the first and second peers clearing currently stored message information received from the other of the first and second peers.

* * * * *